Patented Dec. 25, 1945

2,391,713

UNITED STATES PATENT OFFICE 2,391,713

RECOVERY OF MAGNESIUM FROM VAPOR MIXTURES

Roy C. Kirk, Charles E. Nelson, and Thomas H. McConica, III, Midland, Mich., assignors to The Dow Chemical Company, Midland, Mich., a corporation of Michigan No Drawing. Application September 20, 1944, Serial No. 554,976

5 Claims. (Cl. 75—67)

This invention relates to a process for the recovery of metallic magnesium from vapor mixtures with carbon monoxide.

In the preparation of magnesium by the thermal reduction of magnesia-containing ores with carbon as a reducing agent, the magnesium is liberated at an elevated temperature in the vapor state in admixture with carbon monoxide and must be recovered by condensation. However, as is known, the recovery of magnesium from the vapor mixture is made extremely difficult because of the fact that at ordinary condensing temperatures the magnesium and carbon monoxide tend to interact, reverting to magnesia and carbon. Numerous recovery processes have been suggested for overcoming this difficulty, but most of them are subject to the serious disadvantage that the magnesium is obtained in the form of a pyrophoric dust which can be converted to solid metal only by elaborate and costly treatment.

This latter difficulty is avoided to a considerable extent in a known recovery process in which the magnesium-carbon monoxide vapor mixture is passed into intimate contact with molten lead maintained at such a temperature that the magnesium condenses and dissolves. The resulting lead-magnesium alloy is then separated from the vapor mixture and magnesium is recovered from the alloy by distillation. While this process is superior in some respects to other known recovery methods, it is itself subject to the disadvantage that, as ordinarily carried out at atmospheric pressure, there is considerable chemical interaction between the magnesium and the carbon monoxide during the absorption step, so that a large fraction of the magnesium in the vapor mixture is not recovered. In addition, drossing problems are encountered in the handling of molten lead, with consequent inefficiency of operation and loss of valuable metal.

It is an object of the present invention, then, to provide an improvement in the process just described, whereby chemical interaction between magnesium and carbon monoxide during the absorption step is minimized, and the overall recovery of magnesium is markedly increased.

This object is realized in the process of the invention by carrying out the step of absorbing or condensing magnesium vapor at an absolute pressure between 0.1 and about 2.5 inches of mercury, and maintaining the concentration of magnesium in the molten lead absorbent between about 2.5 and about 19 per cent by weight. Operating in this manner, the recovery of magnesium is far higher than that obtained in prior processes, and drossing of the molten lead absorbent is greatly reduced.

In the practice of the invention, the magnesium and carbon monoxide vapor mixture is prepared in known manner, usually by heating a mixture of carbon and a magnesia-containing material, such as calcined magnesite or calcined dolomite, at a temperature sufficiently high to allow reduction to proceed. The vapors thus generated are passed to an absorbing or condensing zone and there into intimate contact with the molten absorbent. Conveniently, the vapor mixture is passed countercurrent or transverse to a shower of the metal. The magnesium vapor condenses and dissolves in the absorbent, after which the alloy formed is separated from the vapor mixture and removed from the contact zone. The magnesium is then recovered from the alloy by distillation at reduced pressure, and the absorbent thus regenerated is re-used in the process.

The rate of removal of absorbent from the contact zone and the rate at which magnesium is recovered from the absorbent are controlled so that the concentration of magnesium in the alloy during the condensation step is at all times in the range from about 2.5 to about 19 per cent by weight. Optimum results are obtained when the magnesium content of the alloy absorbent is from about 8 to about 15 per cent, since under these conditions dross formation during condensation of magnesium is at a minimum, and distillation of magnesium from the alloy is more readily carried out.

In the process, the absorbent is maintained at such a temperature that the magnesium dissolves readily therein. The maximum operating temperature is, of course, the temperature at which the vapor pressure of magnesium dissolved in the absorbent becomes equal to the partial pressure of magnesium in the vapor mixture to be condensed, while the minimum temperature is the freezing point of the absorbent. In general, absorption temperature below 650° C. are preferred. Even within this range, however, losses of magnesium are unusually low when the temperature is maintained in the range 450° to 550° C.

As already stated, the pressure in the absorption zone is maintained between 0.1 and about 2.5 inches of mercury, by regulating the rate of withdrawal of carbon monoxide from the zone. Absorption at pressures between about 0.2 and about 1.0 inch of mercury is to be preferred, with the optimum pressure being about 0.5 inch. The pressure should be carefully controlled within the range stated, since at absolute pressures above about 2.5 inches the loss of magnesium by reversion to magnesia is materially increased, whereas at below 0.1 inch dissolved magnesium tends to flash-vaporize from the absorbent, slowing operation.

The furnace chamber in which the magnesium-carbon monoxide vapor mixture is generated may be at the same pressure as that at which the absorption zone is controlled, or it may preferably be at a much higher pressure, communicating with the absorption zone through a restricted orifice, as described in detail in a copending application Serial No. 554,975, filed September 20, 1944, by Thomas H. McConica, III.

This application is a continuation-in-part of our prior application Serial No. 381,538, filed March 3, 1941.

What is claimed is:

1. A method of producing magnesium which comprises heating a mixture of a magnesia-containing raw material and carbon to a temperature sufficient to form a vapor mixture of magnesium and carbon monoxide; passing the vapor mixture into intimate contact with a molten metal absorbent consisting of lead containing between about 2.5 and about 19 per cent by weight of dissolved magnesium in a contact zone maintained at an absolute pressure between 0.1 and about 2.5 inches of mercury, while maintaining the absorbent at a temperature above its freezing temperature but below about 650° C., whereby magnesium is dissolved in the absorbent; separating the magnesium-containing absorbent thus formed from the vapor mixture while the concentration of magnesium therein is still within the aforesaid range; and recovering magnesium from the absorbent.

2. In a method of separating magnesium from vapor admixture with carbon monoxide, wherein the vapor mixture is brought into contact with a molten metal absorbent, forming a solution from which magnesium is then recovered, the improved procedure which comprises passing the vapor mixture into intimate contact with an absorbent consisting of lead containing between about 2.5 and about 19 per cent by weight of dissolved magnesium and maintained within said range of composition throughout operation and at a temperature above its freezing temperature but below about 650° C., and maintaining the absolute pressure in the contact zone between 0.1 and about 2.5 inches of mercury.

3. A process according to claim 2 wherein the pressure is maintained between about 0.2 and about 1.0 inch of mercury.

4. A process according to claim 2 wherein the concentration of magnesium in the absorbent is maintained between about 8 and about 15 per cent.

5. In a method of separating magnesium from vapor admixture with carbon monoxide, wherein the vapor mixture is brought into contact with a molten metal absorbent, forming a solution from which magnesium is then recovered, the improved procedure which comprises passing the vapor mixture into intimate contact with an absorbent consisting of lead containing between about 8 and about 15 per cent by weight of dissolved magnesium and maintained within said range of composition throughout operation and at a temperature between about 450° and about 550° C., and maintaining the absolute pressure in the contact zone between about 0.2 and about 1.0 inch of mercury.

ROY C. KIRK.
CHARLES E. NELSON.
THOMAS H. McCONICA, III.